United States Patent [19]

Nagao et al.

[11] Patent Number: 5,376,956
[45] Date of Patent: Dec. 27, 1994

[54] IMAGE FORMING APPARATUS

[75] Inventors: Yoshinori Nagao, Yokohama; Koji Amemiya, Tokyo; Masami Izumizaki, Yokohama; Nobuatsu Sasanuma, Yamato, all of Japan

[73] Assignee: Canon Kabushiki Kaisha, Tokyo, Japan

[21] Appl. No.: 998,737

[22] Filed: Dec. 30, 1992

[30] Foreign Application Priority Data

Jan. 6, 1992 [JP] Japan .................. 4-000115

[51] Int. Cl.$^5$ ...................... G03G 15/01; G03G 21/00
[52] U.S. Cl. ...................... 346/157; 355/208
[58] Field of Search .................. 346/157; 355/208

[56] References Cited

U.S. PATENT DOCUMENTS

| | | | |
|---|---|---|---|
| 4,751,377 | 6/1988 | Ishizaka et al. | 250/205 |
| 4,866,481 | 9/1989 | Yamada et al. | 355/246 |
| 4,999,673 | 3/1991 | Bares | 355/208 |
| 5,001,512 | 3/1991 | Kubota | 355/208 |
| 5,060,013 | 10/1991 | Spence | 355/208 |
| 5,276,459 | 1/1994 | Danzuka et al. | 346/140 R |

FOREIGN PATENT DOCUMENTS

| | | |
|---|---|---|
| 0342060 | 11/1989 | European Pat. Off. . |
| 58-115453 | 7/1983 | Japan . |
| 59-224872 | 12/1984 | Japan . |
| 62-299870 | 12/1987 | Japan . |

Primary Examiner—George H. Miller, Jr.
Attorney, Agent, or Firm—Fitzpatrick, Cella, Harper & Scinto

[57] ABSTRACT

An image forming apparatus forms a predetermined test image, detects a spatial frequency characteristic of the test image, and determines an optimum image forming condition on the basis of the detected spatial frequency characteristic.

11 Claims, 18 Drawing Sheets

FIG.4
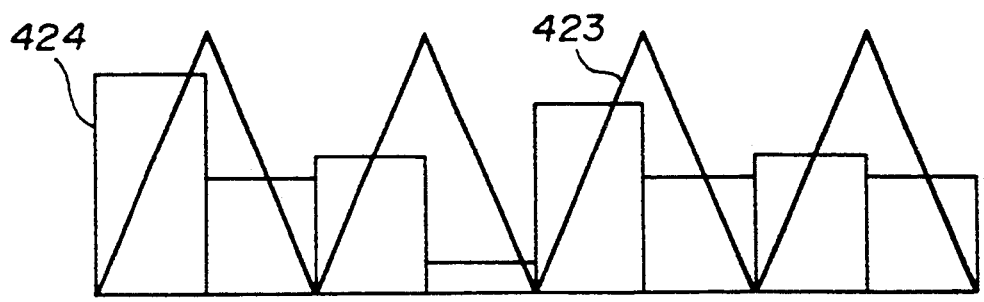
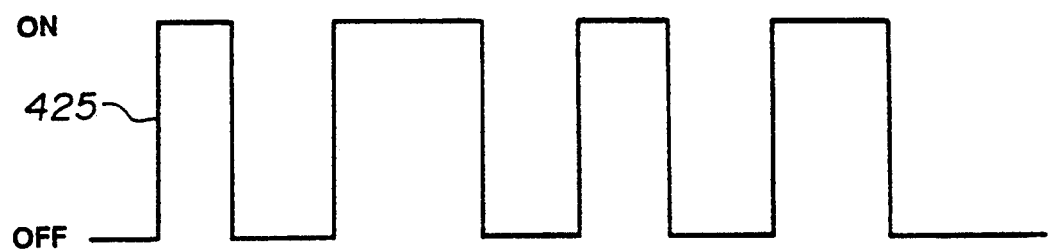
FIG.5
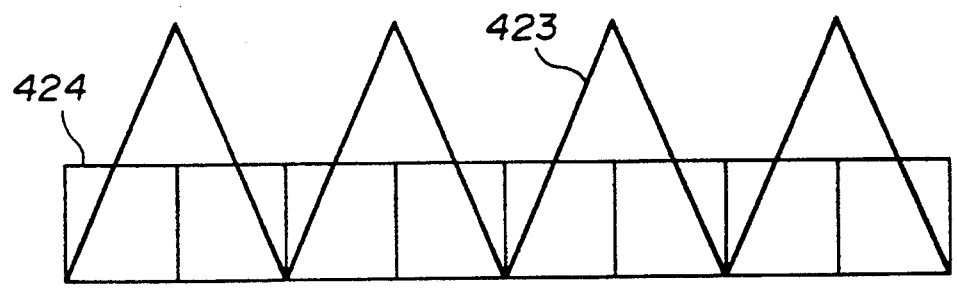
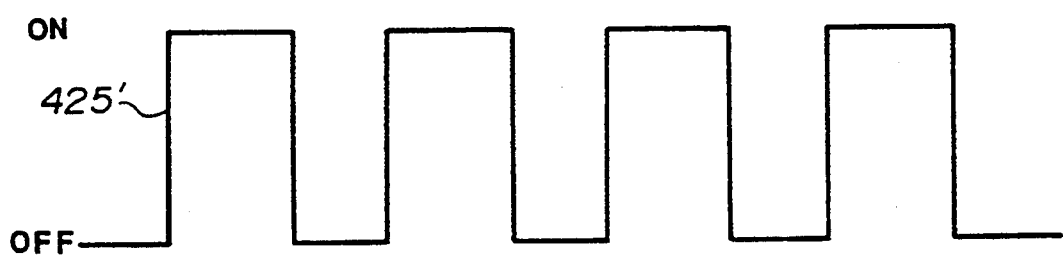

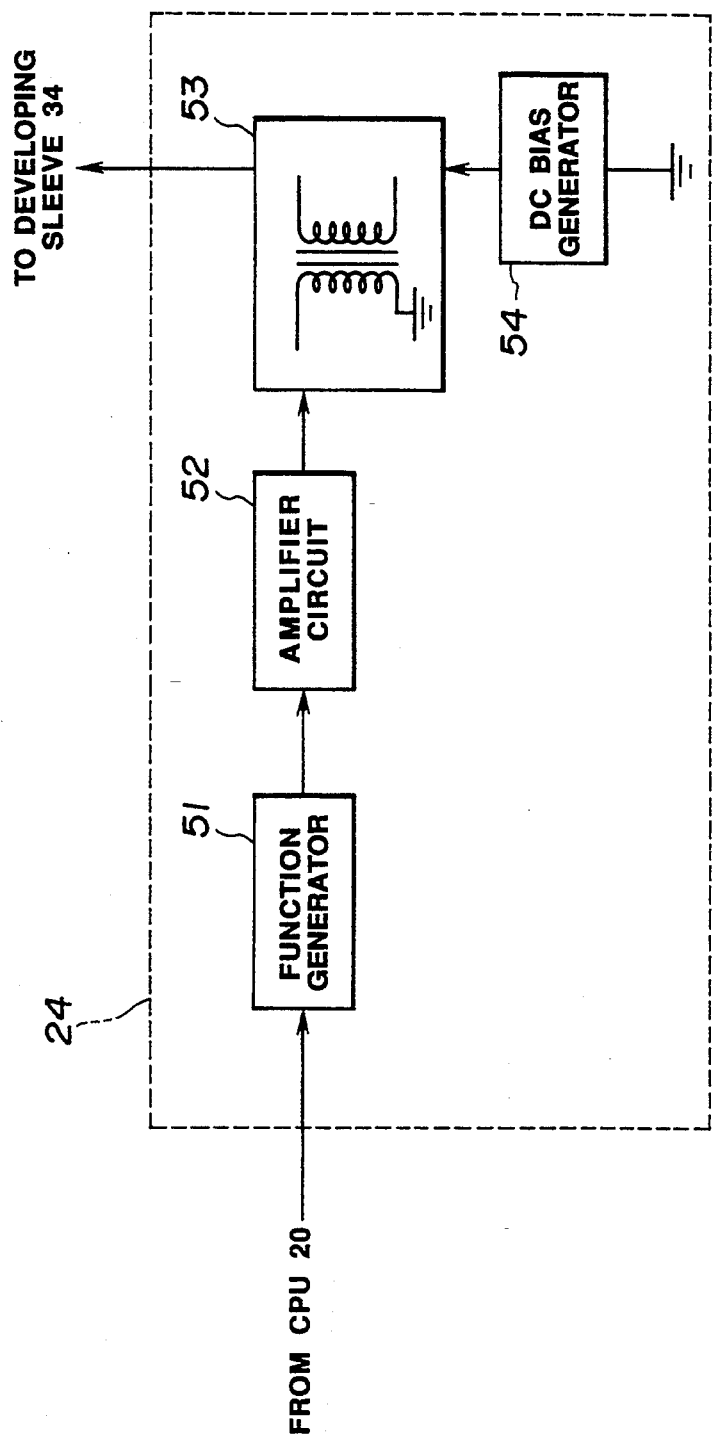

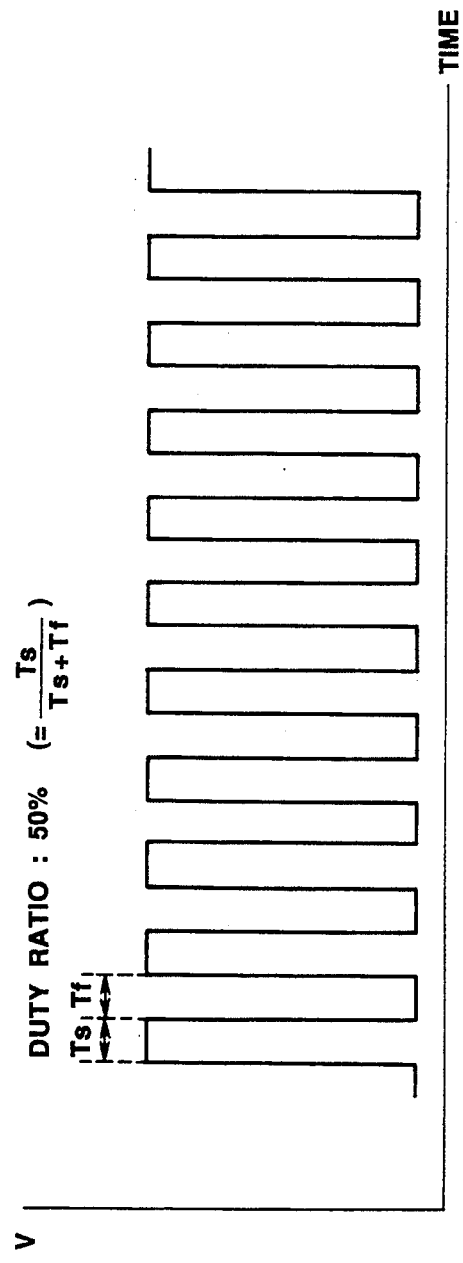
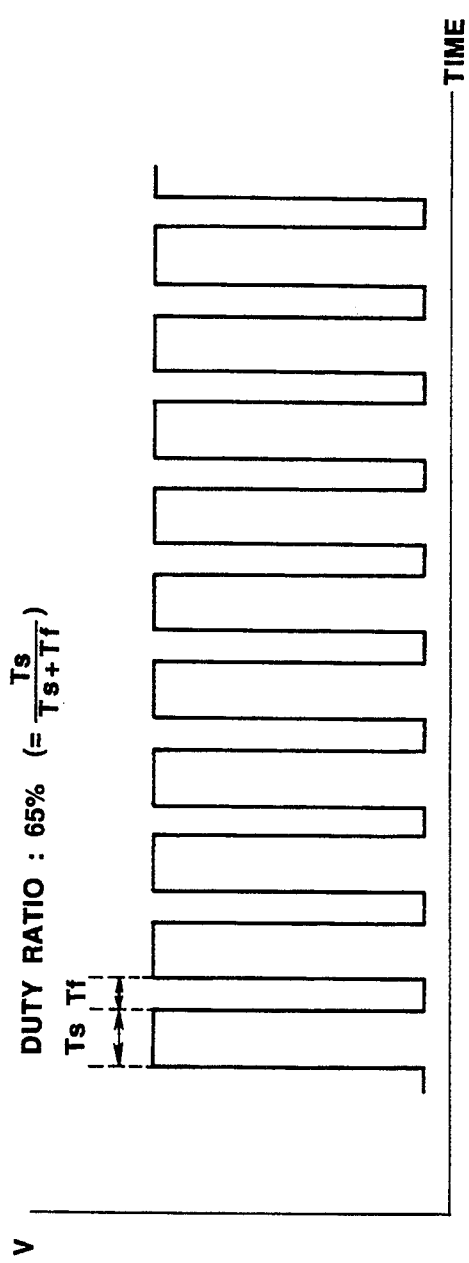

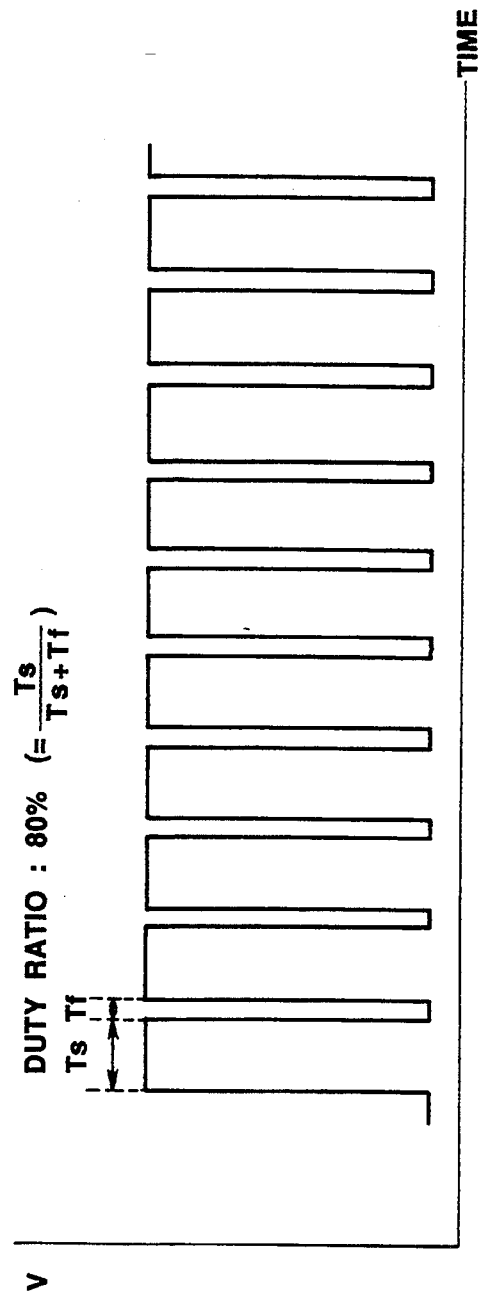

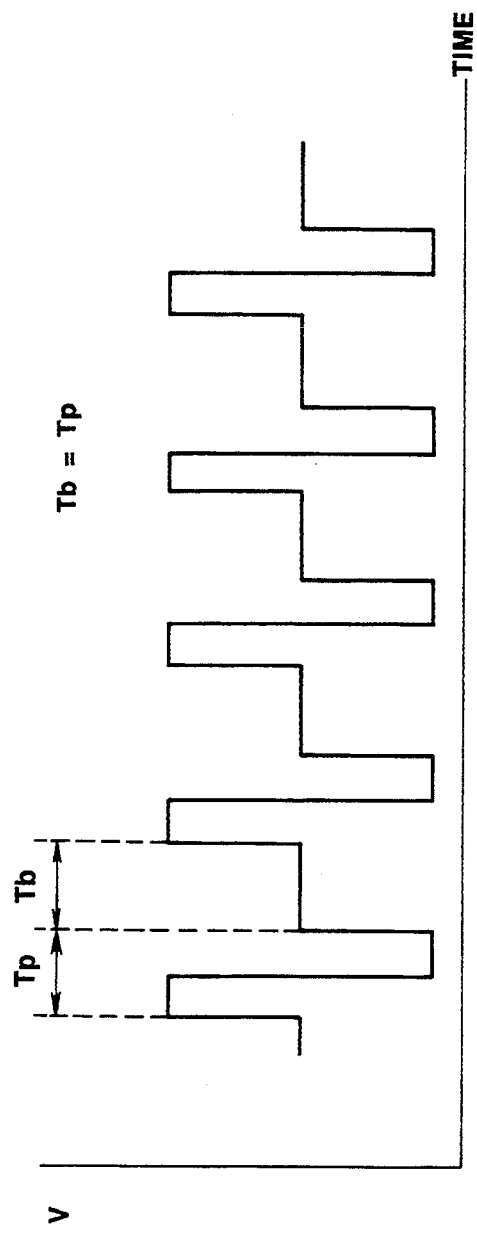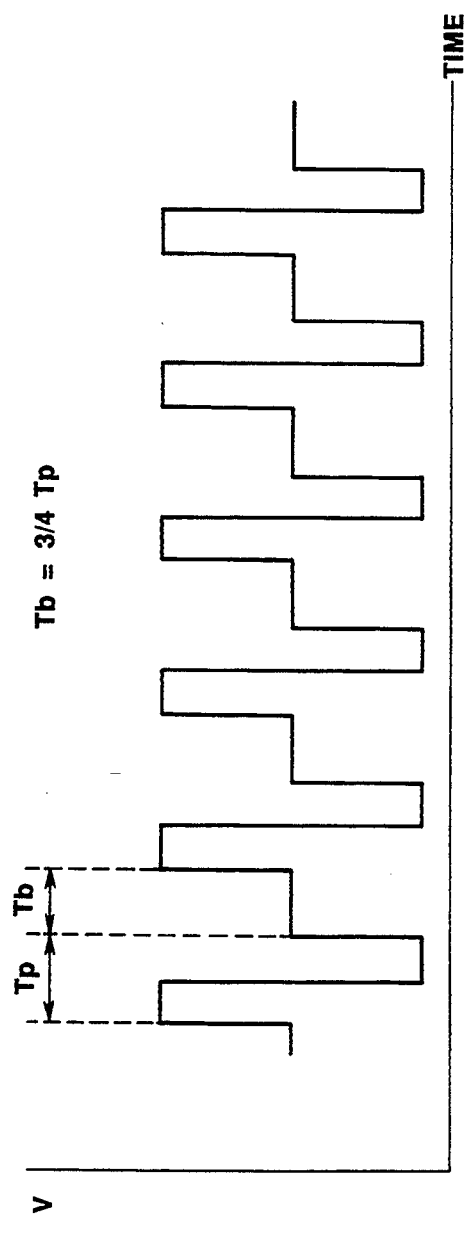

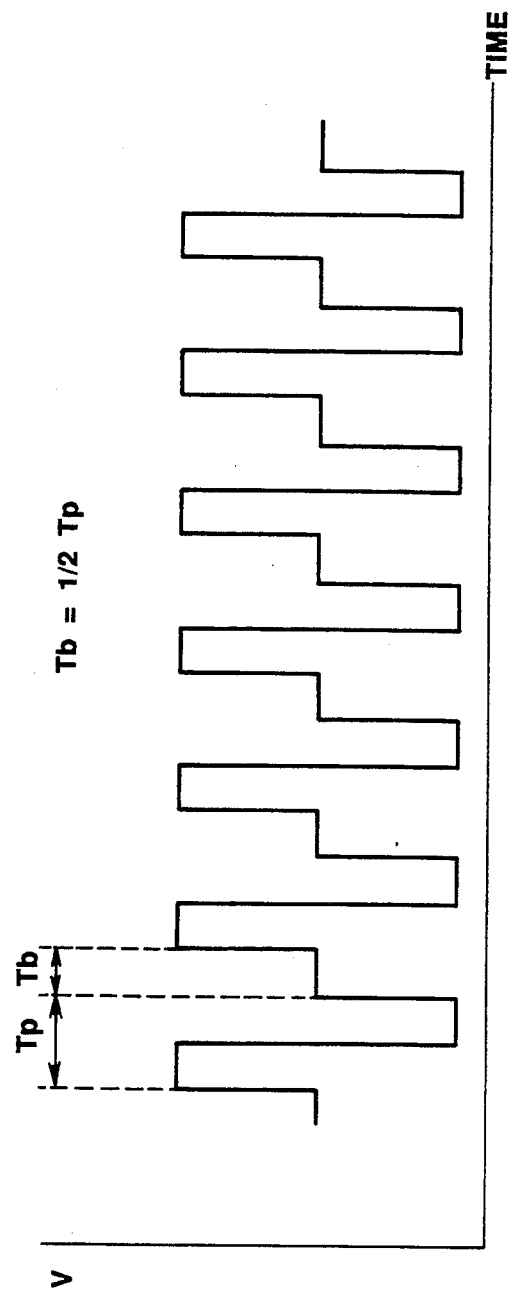

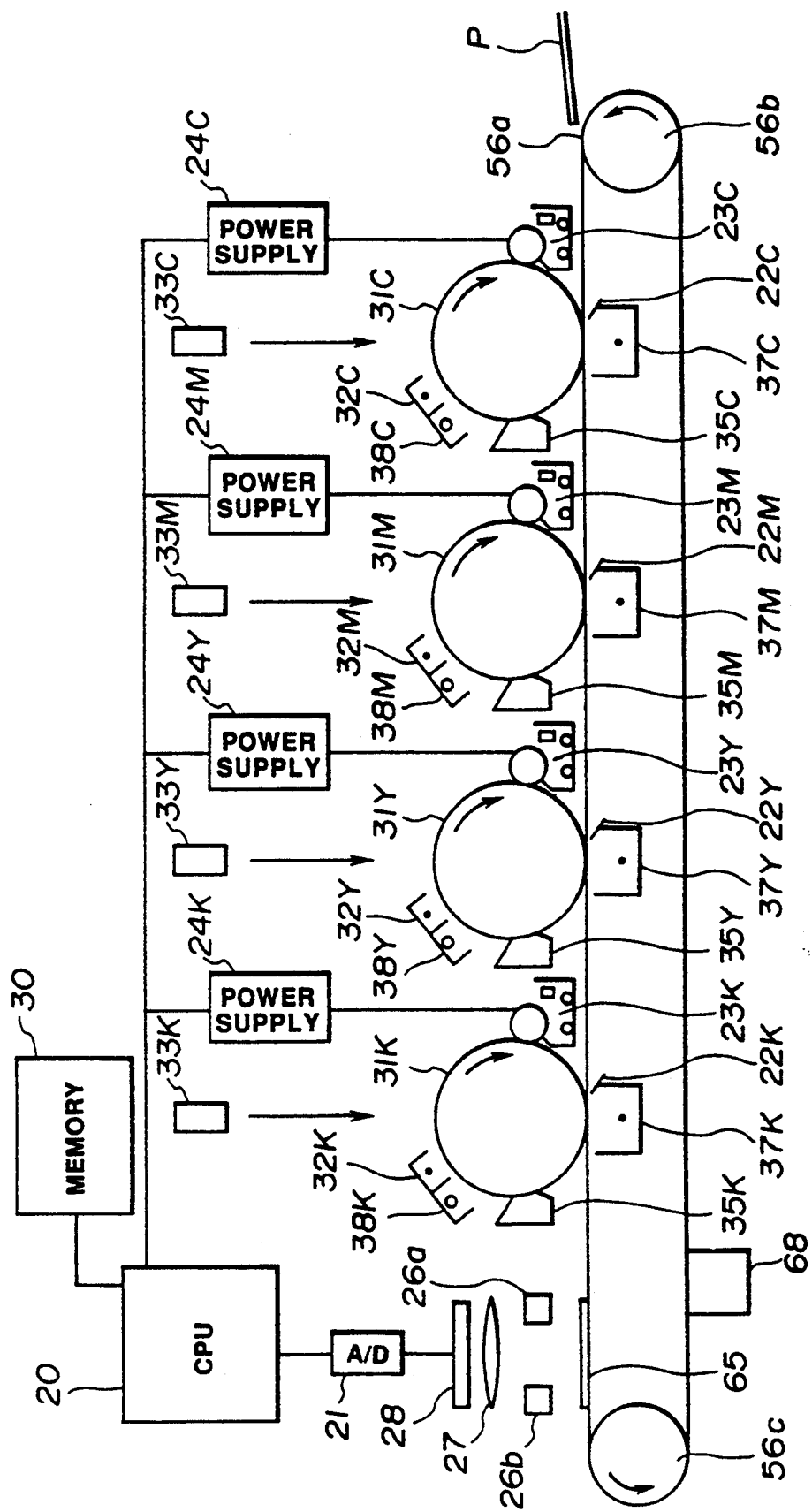

IMAGE FORMING APPARATUS

BACKGROUND OF THE INVENTION

This invention relates to an image forming apparatus, such as a copying machine or a printer, and more particularly to an image forming apparatus which forms an image on a recording medium by using an electrophotographic process.

FIG. 1 shows a sectional view of an image forming apparatus using an electrophotographic process. In FIG. 1, a photosensitive drum 1 bears an image thereon and rotates in the clockwise direction. A discharge device 2, comprising a corona wire and grids, uniformly applies electrostatic charge to the photosensitive drum 1. A preconditioning exposure device 8 exposes the photosensitive drum 1 prior to the corona discharging by the discharge device 2 so as to make the surface potential of the photosensitive drum 1 at approximately zero voltage level. An optical system 3 projects the reflected light from an original document onto the photosensitive drum 1. A developing device 4 develops an electrostatic latent image on the photosensitive drum 1 with toner. A cleaning device 5 cleans residual toner on the photosensitive drum 1. A transfer charging device 7 transfers the toner image on the photosensitive drum 1 onto a recording medium P. A test image 11 is formed on the photosensitive drum 1. A light emitting diode (LED) 12 exposes the test image 11 and a photoelectric sensor 13 detects the amount of the light reflected from the test image 11. A density conversion circuit 6 converts the output voltage from the photoelectric sensor 13 into density values. A central processing unit (CPU) 10 controls various image forming conditions in accordance with the density values input from the density conversion circuit 6.

An image forming operation of the image forming apparatus shown in FIG. 1 will now be described.

The photosensitive drum 1 is uniformly charged by the discharging device 2. Next, the light image corresponding to the original image is exposed through the optical system 3 whereby the electrostatic latent image is formed on the photosensitive drum 1. The electrostatic latent image is developed by the developing device 4 with toner and becomes a visible image. Then, the toner image is transferred onto the recording medium P by the transfer charging device 7.

The density of the toner image thus transferred onto the recording medium P depends upon the various image forming conditions, for example, the surface potential of the photosensitive drum 1 applied by the discharge device 2, the density of toner in the developing device 4, the developing power of the developing device 4 and the transfer power of the transfer charging device 7. The density of the toner image in a laser beam printer, which exposes a light image on the photosensitive drum with a laser beam, also depends on the image signals for modulating the laser beam or the intensity of the laser beam.

Accordingly, it is necessary to control the various image forming conditions and monitor and if necessary adjust them so as to form an image with an optimum density. Therefore, prior to the image formation, the density of the test image 12 formed on the photosensitive drum 1 is detected by the photoelectric sensor 13, and the CPU 10 controls the various image forming conditions in accordance with the detected density of the test image 12. The above mentioned test image 12 is formed on the photosensitive drum 1 in accordance with the electrophotographic process by exposing a predetermined light image through the optical system 3.

FIG. 2 shows an example of the test image 12 formed on the photosensitive drum 1. A black image 14 where the toner adheres and a white image 15 where the toner does not adhere are formed within the detection area of the photoelectric sensor 13 on the photosensitive drum 1. By detecting the densities of the black image 14 and the white image 15 by means of the photoelectric sensor 13, the maximum black density and the contrast between the black and white images can be determined. The various image forming conditions can be controlled in accordance with the determined results so as to control the density of the image to be formed.

In the above described construction, the density of the test image 11 is detected by the single photoelectric sensor 13, so that the density of the simple test image formed within a predetermined small area on the photosensitive drum 1 can be detected.

However, the image formed on the photosensitive drum 1 on the basis of the original document is usually more complex than the test image 11, accordingly it is impossible to control the density of the complex original image to be formed.

SUMMARY OF THE INVENTION

The present invention has been made in the light of the above problems and its object is to provide an image forming apparatus and method which can form a good quality image.

The present invention also provides an image forming apparatus and method which can form an image under the optimum image forming conditions.

The present invention also provides an image forming apparatus and method which can determine the optimum image forming conditions.

The present invention also provides an image forming apparatus and method which can form an image with a high spatial frequency characteristic.

According to a first aspect of the present invention, there is provided an image forming apparatus comprising forming means for forming an image in accordance with an image forming condition; detecting means for detecting the spatial frequency characteristic of the image formed by said forming means; and determining means for determining the image forming condition on the basis of the spatial frequency characteristic detected by said detecting means.

According to the second aspect of the present invention there is provided an image forming method comprising forming a plurality of test images under different image forming conditions; detecting spatial frequency characteristics of each of the plurality of test images; and determining an optimum image forming condition on the basis of the spatial frequency characteristics detected.

The above and other aspects, features and advantages of the present invention will become apparent from the following detailed description of the preferred embodiments.

BRIEF DESCRIPTION OF THE DRAWINGS

FIG. 4 is a drawing which shows a process for image signals;

FIG. 5 is a drawing which shows a process for test image signals;

FIG. 11 is a block diagram of a power supply;

FIGS. 12(A), (B) and (C) are drawings which show examples of AC bias of a first embodiment of the present invention;

FIGS. 14(A), (B) and (C) are drawings which show examples of AC bias of a second embodiment of the present invention;

FIG. 18 is a drawing which shows a still further construction of the colour copying apparatus.

DESCRIPTION OF THE PREFERRED EMBODIMENT

Figure 1:
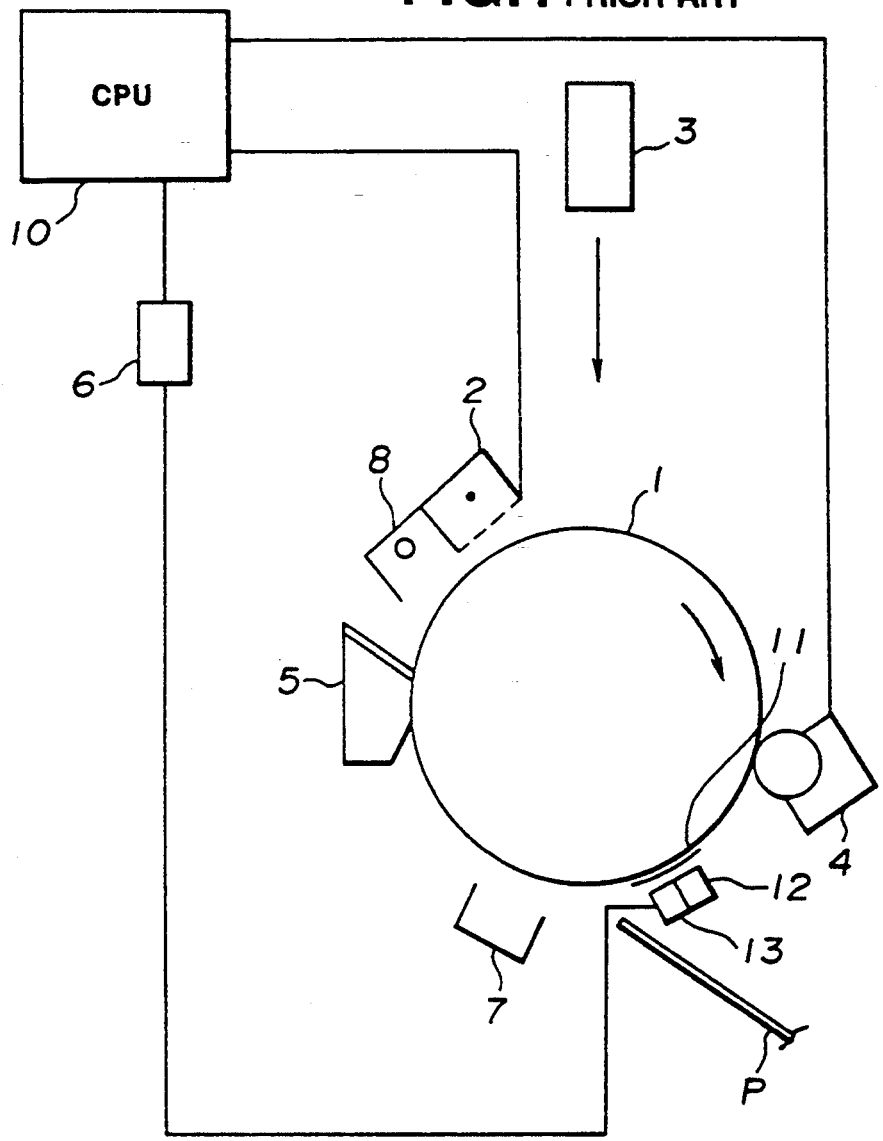
FIG. 1 is a drawing which shows a prior art of an image forming apparatus.
Figure 2:
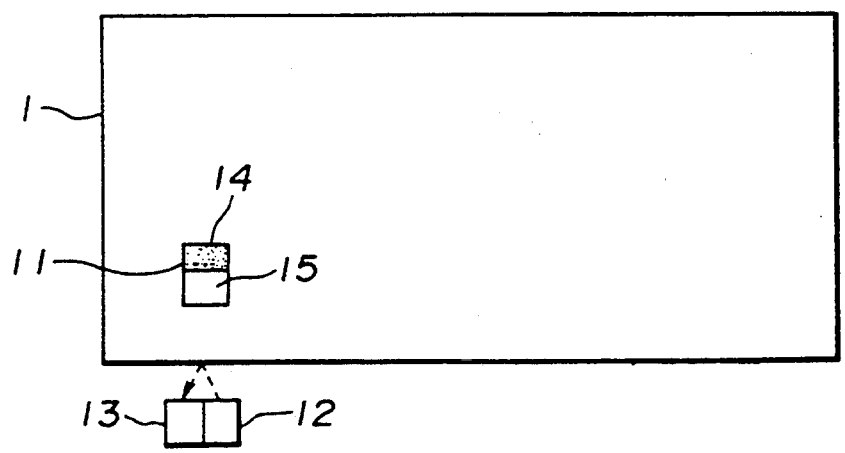
FIG. 2 is a drawing which shows a test image which is formed in the image forming apparatus shown in FIG. 1.
Figure 3:
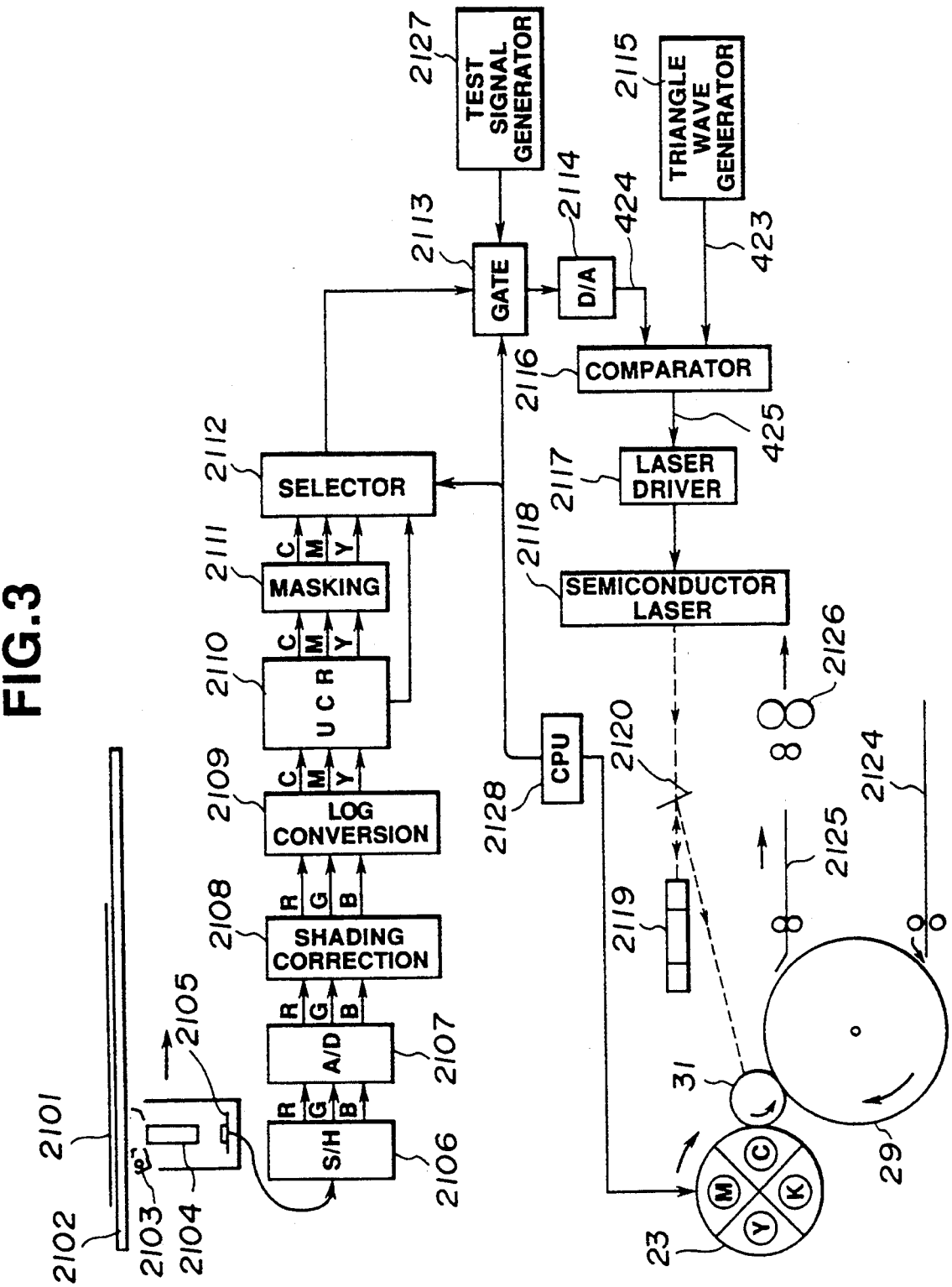
FIG. 3 is a block diagram of a colour copying apparatus to which the present invention may be applied.

FIG. 3 shows a block diagram of a colour copying apparatus using a laser beam printer, to which the present invention may be applied.

In the drawing, a colour original document 2101 to be copied is placed on an original mounting glass table 2102. A light source 2103 is adapted to illuminate the original document 2101. A rod lens array 2104 forms an image of light reflected from the original document 2101 illuminated by the light source 2103 onto a CCD line sensor 2105. The CCD line sensor 2105 is arranged such that filters of red (R), green (G) and blue (B) are applied on the line alternately, and converts the image of the original into electrical signals by separating it into the three primary colours. The aforementioned components 2103–2105 are integrally accommodated in a reading head.

The reading head is made to effect scanning by a scanning mechanism (not shown) in the direction of the arrow (sub-scanning direction), thereby scanning and reading the image of the original document 2101.

A sample hold circuit 2106 samples and holds analog electrical signals sent from the CCD line sensor 2105 and converts them into time serial signals of R,G,B. An analog-digital (A/D) converter 2107 subjects output signals from the sample hold circuit 2106 to analog-digital conversion. A shading correction circuit 2108 corrects variations in the sensitivity for elements of the CCD line sensor 2105 and unevenness in illumination. A logarithm conversion circuit 2109 converts the R, G and B signals corrected by the shading correction circuit 2108 into complementary-colour density signals of cyan (C), magenta (M) and yellow (Y). A UCR circuit 2110 is adapted to generate black (K) signals by extracting the minimum value among the C, M and Y signals sent from the logarithm conversion circuit 2109 and subtract a component corresponding to the K signal from the C, M and Y signals. A masking circuit 2111 corrects unnecessary absorption and the like of an output-side colouring material. A selector circuit 2112 selects signals to be supplied to the printer from among the Y,M,C and K signals obtained as described above.

A test signal generator 2127 generates test image signals which are used for forming a test image. A gate circuit 2113 selects either the colour signals (Y,M,C,K signals) from the selector circuit 2112 or the test image signals from the test signal generator 2127, and supplied the selected signals to the printer.

A digital-analog (D/A) converter 2144 converts digital signals sent from the gate circuit 2113 into analog signals. As shown in FIG. 4, a comparator 2116 compares the output 424 of the D/A converter 2114 with a triangular wave signal 423 of a predetermined period (200 lpi), which is produced from a triangular wave generator 2115, thereby a pulse width modulation (PWM) signal 425 having a pulse width proportional to the image signal is obtained. The PWM signal is applied to a semiconductor laser 2118 via a laser driver 2117.

The laser beam emitted by the semiconductor laser 2118 is modulated by the PWM signal and reaches a rotating photosensitive drum 31 via a polygonal mirror 2119 rotating at high speed and a reflecting mirror 2120.

An electrostatic latent image formed on the photosensitive drum 31 upon application of the laser beam is developed by a rotary developing device 23 sequentially in the order of C,M,Y and K. The C,M,Y and K toner images are transferred onto a recording medium 2124 on the transfer drum 29 sequentially in the order of C,M,Y and K. The recording medium 2124 is conveyed from a cassette (not shown) and is wound around the transfer drum 29. Upon completion of the transfer of the C,M,Y and K toner images, the recording medium 2124 is subjected to thermal fixing by a fixer 2126 and is discharged to the outside as a final reproduced image.

In the above-described arrangement, four scanning and reading operations of the original document are necessary which are effected in synchronism with the C,M,Y and K output of the printer, and the selector 2112 selects one of C,M,Y and K signals in synchronism with the C,M,Y and K output of the printer and sends the selected colour signal to the printer.

The test signal generator 2127 supplies constant signals having an intermediate level as the test image signals. The test image signals selected by the gate circuit 2113 are converted in to analog signals 424' by the D/A converter 2114. As shown in FIG. 5, the analog signals 424' are compared with the triangular wave signals 423 by the comparator 2116 and the PWM signals 425' having a constant pulse width from the comparator 2116 is supplied to the laser driver 2117.

Figure 6:
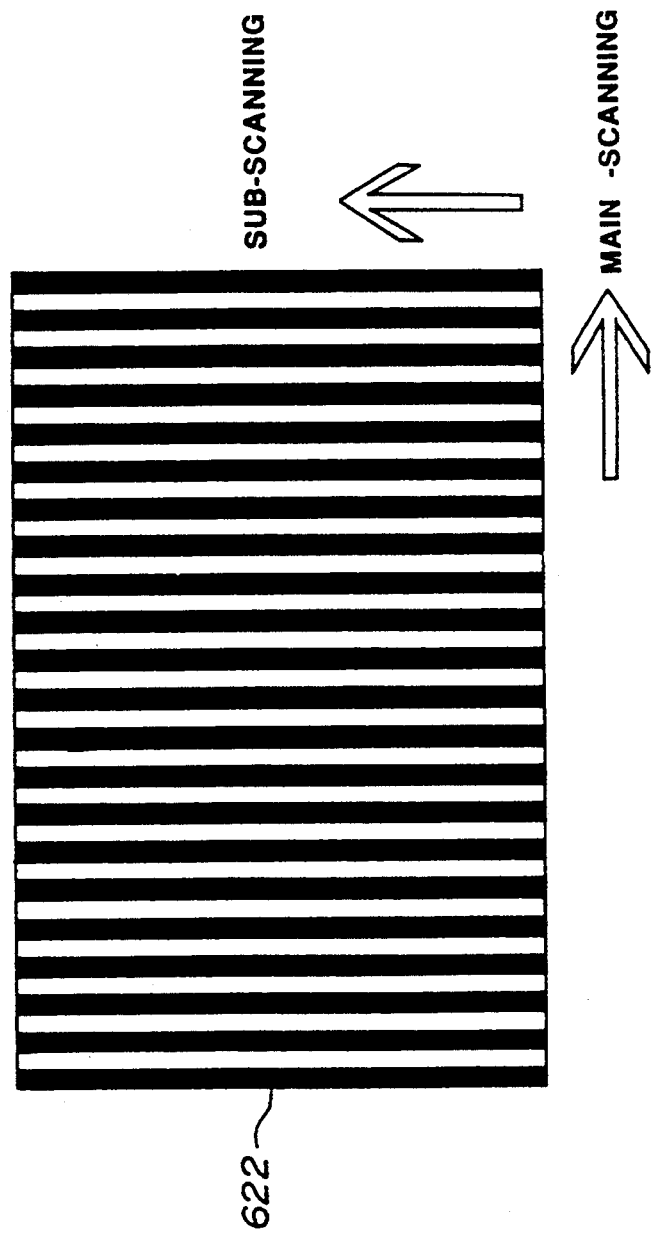
FIG. 6 is a drawing which shows a test image which is formed in the colour copying apparatus shown in FIG. 3.

FIG. 6 shows an enlargement of the test image formed on the photosensitive drum 31 in accordance with the test image signals. The test image includes a striped pattern 622 at 1/200 inch intervals on the main-scanning direction.

Therefore, the spatial frequency characteristic representing the degree of image reproduction can be determined by monitoring the test image formed in accordance with the test image signals.

Figure 7:
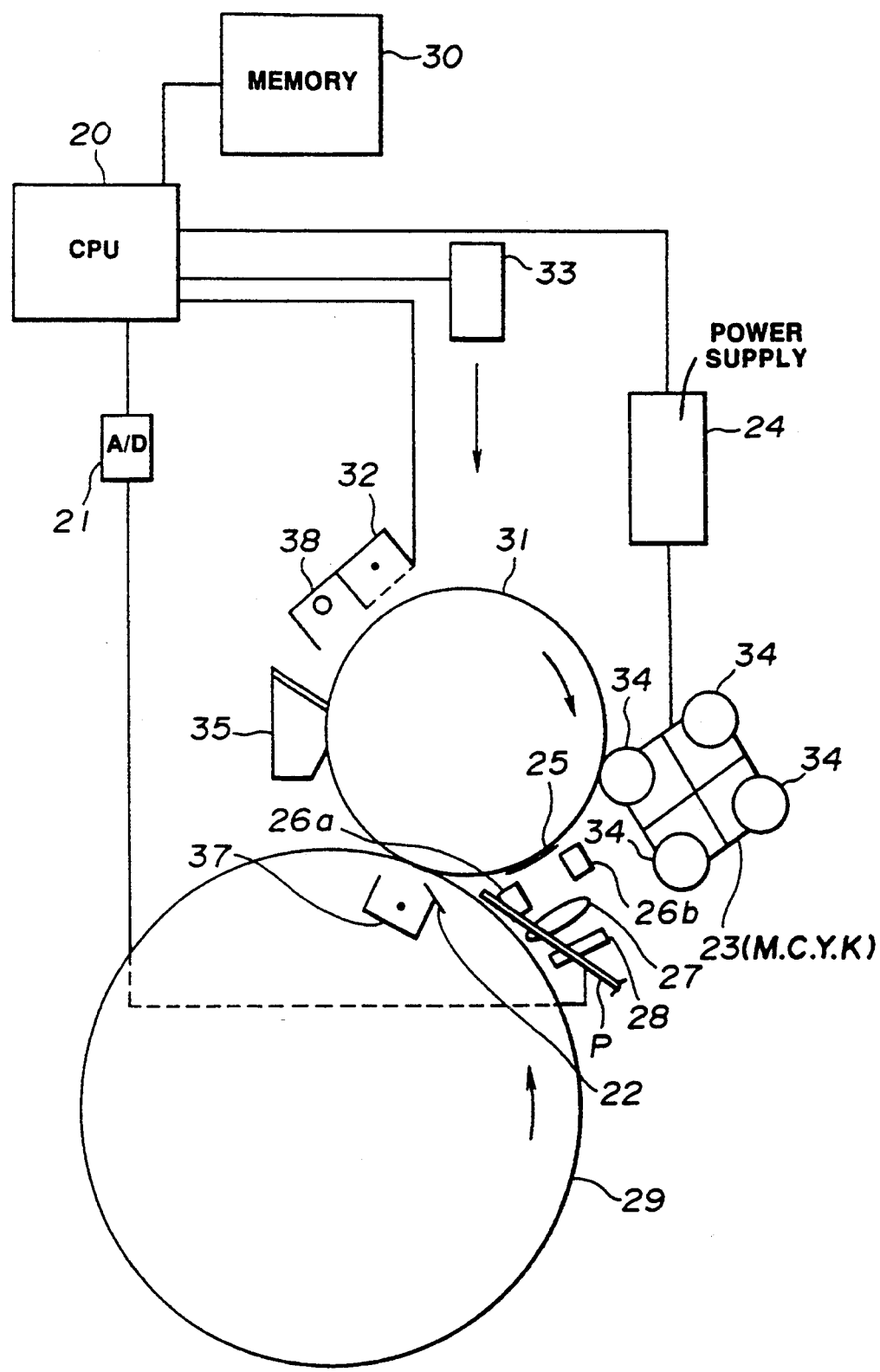
FIG. 7 is a drawing which shows a detailed construction of the colour copying apparatus shown in FIG. 3.

FIG. 7 shows a detailed construction of the printer of the colour copying apparatus shown in FIG. 3.

The photosensitive drum 31 bears an image thereon and rotates in the clockwise direction. A discharge device 32, comprising a corona wire and grids, uniformly applies electrostatic charge to the photosensitive drum 31. A preconditioning exposure device 38 exposes the photosensitive drum 31 before the corona discharging by the discharge device 32 so as to set the surface potential of the photosensitive drum 31 approximately at zero voltage. An optical system 33, comprising a laser source, a collimator lens and a polygonal mirror etc., projects the laser beam onto the photosensitive drum 31. A developing device 23 develops an electrostatic latent image on the photosensitive drum 31 with four colour (C,M,Y,K) toners. A cleaning,device 35 cleans residual toner on the photosensitive drum 31. The transfer drum 29 holds a recording medium thereon and rotates in the direction opposite to the photosensitive drum 31. A transfer charging device 37 transfers the toner image on the photosensitive drum 31 onto the recording medium P on the transfer drum 29. A plastics sheet 22 presses the recording medium P on the transfer drum 29 against the photosensitive drum 31. A power supply unit 24 applies to a developing sleeve 34 a developing bias which is AC wave applied with DC component. A test image 25 is formed on the photosensitive drum 31. Light sources 26a, 26b expose the test image 25 and a one-dimensional CCD line sensor (CCD sensor) 28 photoelectrically reads the test image 25. An optical lens 27 directs the light reflected from the test image 25 onto the CCD sensor 28. An A/D converter 21 converts analog signals output from the CCD sensor 28 into digital signals which are stored in a memory 30. A CPU 20 is adapted to determine an optimum developing condition on the basis of the digital signals stored in the memory 30 and control the developing bias to be supplied to the developing sleeve 34 from the power supply unit 24.

The CCD sensor 28 contains a row of several hundred photocells, the size of each photocell being 18 $\mu m \times 13$ $\mu m$. The CCD sensor 28 is provided so that the direction of the row of photocells is aligned with the direction of the axis of rotation of the photosensitive drum 31. Accordingly, the repetition of black and white images, included in the striped pattern of the test image (as shown in FIG. 6), can be read by the CCD sensor 28.

The CCD sensor 28 is driven with the clock signals having a constant frequency which is determined in accordance with the size of the photocell, an optical magnification, and the rotation speed of the photosensitive drum 31. For example, if the size of the photocell is 18 $\mu m \times 13$ $\mu m$, the optical magnification is 1:1 and the rotation speed of the photosensitive drum is 120 mm/sec., the drive frequency of the clock-signals is determined to be 9.23 kHz. The drive frequency is also used for writing the digital signals into the memory 30 as the memory drive frequency.

Figure 8:
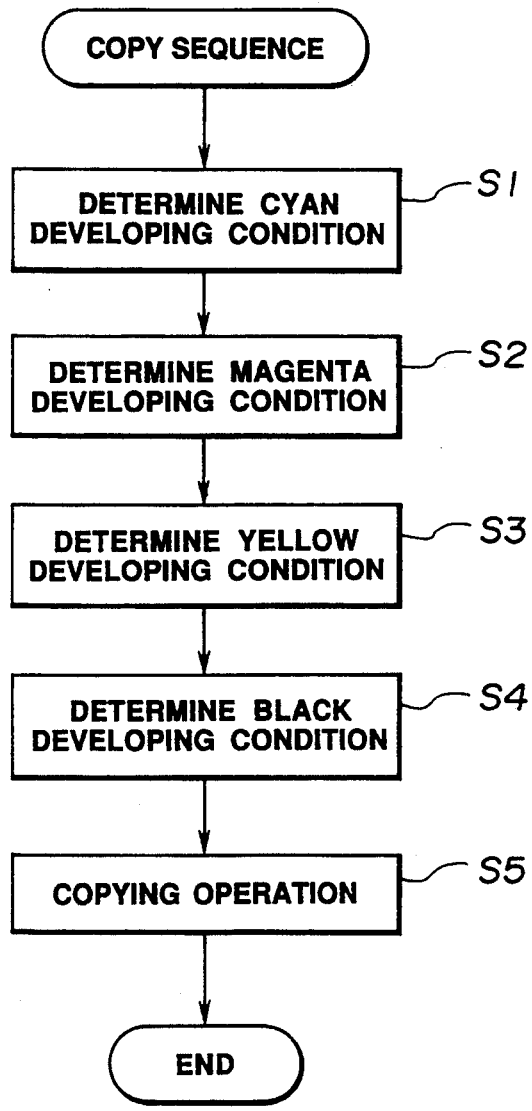
FIG. 8 is a flow chart which shows a colour copying sequence of the colour copying apparatus shown in FIG. 3.

FIG. 8 is a flow chart which shows a colour copying sequence of the colour copying apparatus shown in FIG. 3.

Prior to the colour copying operation for a colour original document 2101 mounted on the original mounting glass table 2102, the developing conditions of C,M,Y and K are determined, respectively.

Namely, a cyan developing device is set and a cyan test image is formed on the photosensitive drum 31 on the basis of the test image signals selected by the gate circuit 2113. According to the cyan test image, the developing condition of cyan is determined. (S1)

Next, a magenta developing device is set and a magenta test image is formed on the photosensitive drum 31. According to the magenta test image, the developing condition of magenta is determined. (S2)

In the same manner, the developing conditions of yellow and black are sequentially determined. (S3, S4)

Thus, determined developing conditions are stored in an internal memory of the CPU 20.

After the developing conditions of C,M,Y and K are determined, the colour copying operation for the colour original document is performed. (S5)

During the colour copying operation, developing with each of C,M,Y and K toners is performed under the developing condition stored in the internal memory.

Figure 9:
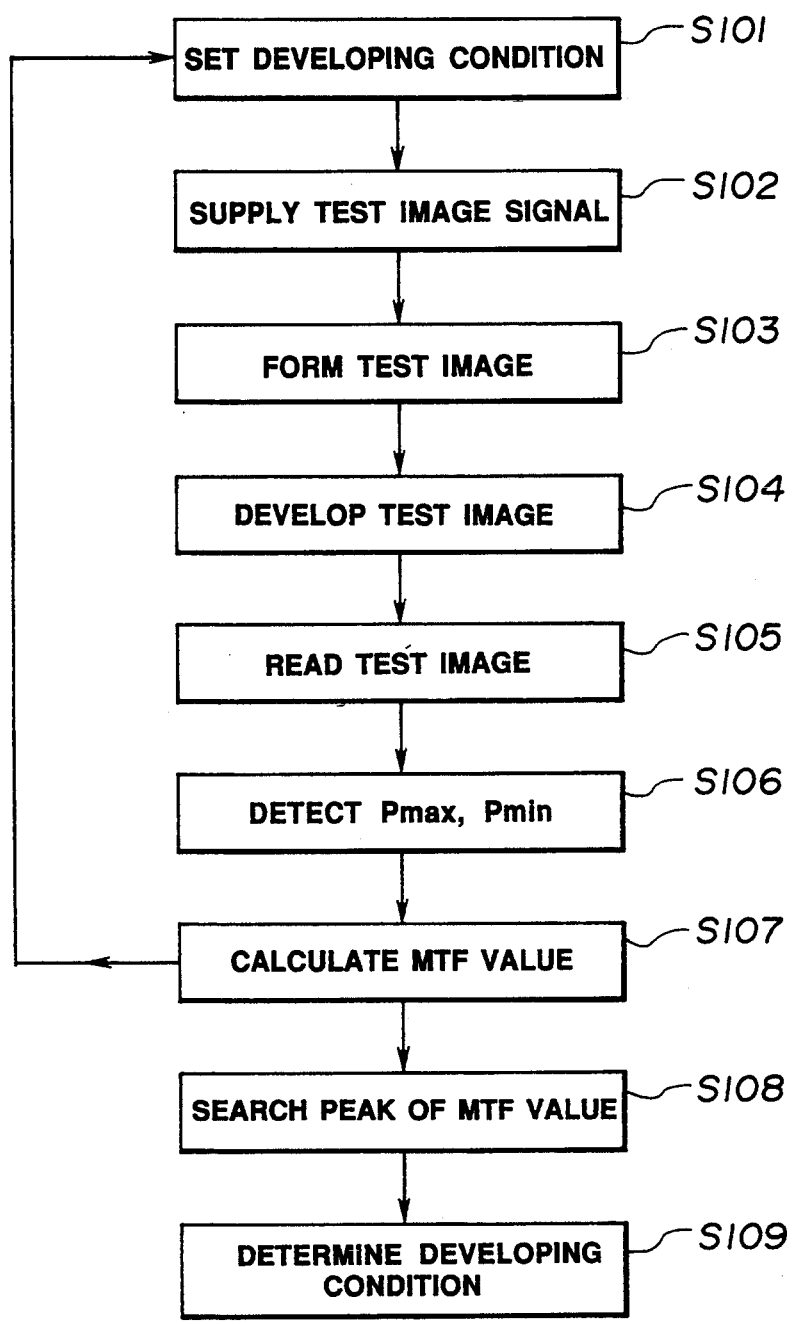
FIG. 9 is a flow chart which shows a procedure for determining a developing condition of the colour copying apparatus shown in FIG. 3.

FIG. 9 is a flow chart which shows the procedure for determining the developing condition in accordance with the MTF (Modulation Transfer Function) detection.

First, the CPU 2128 sets the developing device corresponding to a colour to be determined as the developing condition, and sets a predetermined initial developing condition corresponding to the developing device as the developing condition. (S101)

Next, the CPU 2128 makes the gate circuit 2113 select the test image signals from the test signal generator 2127 so as to convert the test image signals into the PWM signals for forming the test image by the D/A converter 2114 and the comparator 2116 and supply the PWM signals to the laser driver 2117. (S102)

Therefore, an electrostatic latent image representative of the test image is formed on the photosensitive drum 31 by the laser beam emitted by the semiconductor laser 2118. (S103)

The electrostatic latent image formed on the photosensitive drum 31 is developed by the set developing device under the set developing condition so as to form the test image shown in FIG. 6 on the photosensitive drum 31. (S104)

Then, the test image 25 formed on the photosensitive drum 31 is read by the CCD sensor 28. (S105)

Namely, when the optical image of the test image 25 is projected onto the CCD sensor 28, the CCD sensor 28 outputs the voltages of which levels vary relatively to the shading of the test image 25. The voltages corresponding to the photocells of the CCD sensor 28 are picked up line sequentially and are converted into 8-bit digital signals by the A/D convertor 21. Then, the 8-bit digital signals are stored in the memory 30. It is desirable that a circuit should be provided for removing reset signals included in the CCD output signals.

Figure 10:
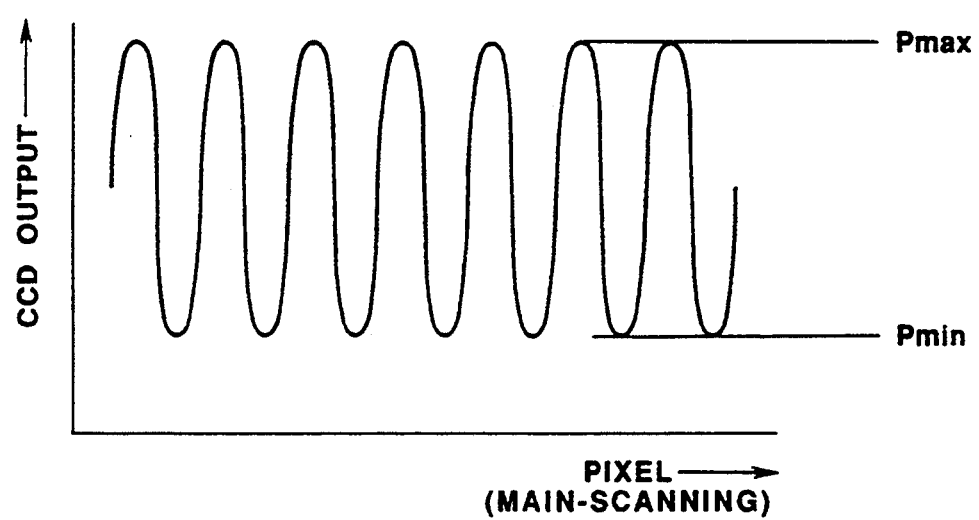
FIG. 10 is a drawing which shows CCD output signals.

FIG. 10 is a drawing which shows the CCD output signals stored in the memory 30.

In the memory 30, the PWM line corresponding to the striped pattern of the test image shown in FIG. 6 is reproduced. In FIG. 10, "Pmax" designates the CCD output value corresponding to the toner image within the test image and "Pmin" designates the CCD output value corresponding to the part between the toner images within the test image. In an ideal image forming operation, "Pmax" should be equal to the CCD output value corresponding to the maximum density of the toner image and "Pmin" should be equal to the CCD output value corresponding to the density of the part which does not carry the toner at all.

However, in an actual image forming operation, the value of the actual "Pmax" of the PWM line reproduced in the memory 30 is lower than that of the ideal "Pmax", and the value of the actual "Pmin" of the PWM line is higher than that of the ideal "Pmin". Accordingly, the difference between the actual "Pmax" and "Pmin" is smaller than that of the ideal "Pmax" and "Pmin".

Therefore, by detecting the values of the Pmax and Pmin reproduced in the memory 30, it is possible to obtain the spatial frequency characteristic (Modulation Transfer Function MTF) representing the degree of image reproduction.

Besides, the values of the Pmax,Pmin reproduced in the memory 30 are variable in response to the various image forming conditions, for example, the surface potential of the photosensitive drum 31 applied by the discharge device 32, the density of toner in the developing device 23, or the developing power of the developing device 23.

Accordingly, by controlling the image forming conditions so that the value of the MTF, which is obtained on the basis of the Pmax,Pmin in the memory 30, becomes maximum value, the optimum image formation can be carried out.

For that purpose, the CPU 20 detects the values of the Pmax,Pmin of the PWM line reproduced in the memory 30. (S106)

The CPU 20 then calculates the MTF on the basis of the detected values of the Pmax,Pmin. (S107)

In this embodiment, the MTF representative of the spatial frequency characteristic is calculated with the equation (1).

$$MTF = (Pmax - Pmin)/(Pmax + Pmin) \quad 1$$

The calculated MTF is stored in the internal memory of the CPU 20 together with the corresponding developing condition.

Next, the CPU 20 sets a different developing condition. (S101)

The CPU 20 forms the test image and calculates the MTF under the different developing condition in the same manner.

The above described calculations of the MTF are carried out several times under the different developing conditions. The calculated MTFs are stored in the memory of the CPU 20 together with the corresponding developing conditions.

After that, the CPU 20 searches the peak value among the plurality of MTFs stored in the memory. (S108)

Then, the CPU 20 determines the developing condition corresponding to the peak value of the MTF as an optimum developing condition for the developing device which is currently set. (S109)

As explained above, the test images are formed in succession while changing the developing conditions, the MTFs are calculated, and the developing condition corresponding to the efficient MTF is selected. Therefore, high quality images can always be formed.

The developing method and the developing condition which may apply to this embodiment will now be described.

In this embodiment, the developing agent which consists of a mixture of toner and carrier, which is called two-component toner, is used for developing the electrostatic latent image. An alternating electric field is formed between the developing sleeve 34 and the photosensitive drum 31, so that the attraction of toner to the image portion of the photosensitive drum 31 and the removal of toner from the background portion of the photosensitive drum 31 can be efficiently carried out. Therefore, the electrostatic latent image on the photosensitive drum 31 can be fully developed and turned into a high contrast visible image without fogging.

By changing the alternating electric field between the developing sleeve 34 and the photosensitive drum 31, the developing condition is changed, so that the state of the developed image, such as the contrast or the density of the image, can be changed.

FIG. 11 is a drawing which shows the construction of the power supply 24 which applies the developing bias to the developing sleeve 34.

As explained above, in this embodiment, the alternating electric field is formed between the developing sleeve 34 and the photosensitive drum 31. Therefore, the AC bias which is formed by applying DC voltage (DC bias) to AC voltage is supplied to the developing sleeve 34 from the power supply 24 as the developing bias.

In FIG. 11, a function generator 51 generates AC wave (square wave) in response to the instruction from the CPU 20. An amplifier circuit 52 amplifies the AC wave from the function generator 51. An AC transformer 53 transforms the voltage of the AC wave into high voltage. A DC bias generator 54 generates the DC voltage (DC bias) to be applied to the AC wave.

According to the construction, the AC transformer 53 generates high voltage wave which is formed by applying the DC voltage generated from the DE bias generator 54 to the high voltage AC wave formed from the square wave generated from the function generator 51. Then, the high voltage wave is applied to the developing sleeve 34 as the AC bias.

Accordingly, the alternating electric field can be formed between the developing sleeve 34 and the photosensitive drum 31.

By changing the state of the square wave generated from the function generator 51, such as the frequency or the duty ratio of the square wave, it is possible to change the alternating electric field between the developing sleeve 34 and the photosensitive drum 31.

Therefore, by changing the state of the square wave generated from the function generator 51 in accordance with the instruction from the CPU 20, the developing condition for developing the electrostatic latent image can be changed.

For example, while changing the duty ratio of the AC wave (square wave) applied to the developing sleeve 34, the CPU 20 forms the test images and calculates the MTFs. Then the CPU 20 searches the peak value of the MTF. In this manner, the suitable duty ratio of the AC wave can be determined as the optimum developing condition.

Namely, fox obtaining the optimum duty ratio of the AC wave, the nine test images are formed while changing the duty ratio of the AC wave from 45% to 85% at intervals of 5%.

In this embodiment, the duty ratio of the AC wave is expressed by the following equation:

$$(\text{DUTY RATIO}) = Ts/Ts + Tf$$

Ts: period of plus component
Tf: period of minus component

FIGS. 12(A), 12(B) and 12(C) are drawings which show the examples of the AC bias applied to the developing sleeve 34. In this embodiment, the frequency of the AC wave is 500 Hz and the peak to peak voltage is 2 kVDpp.

Figure 13:
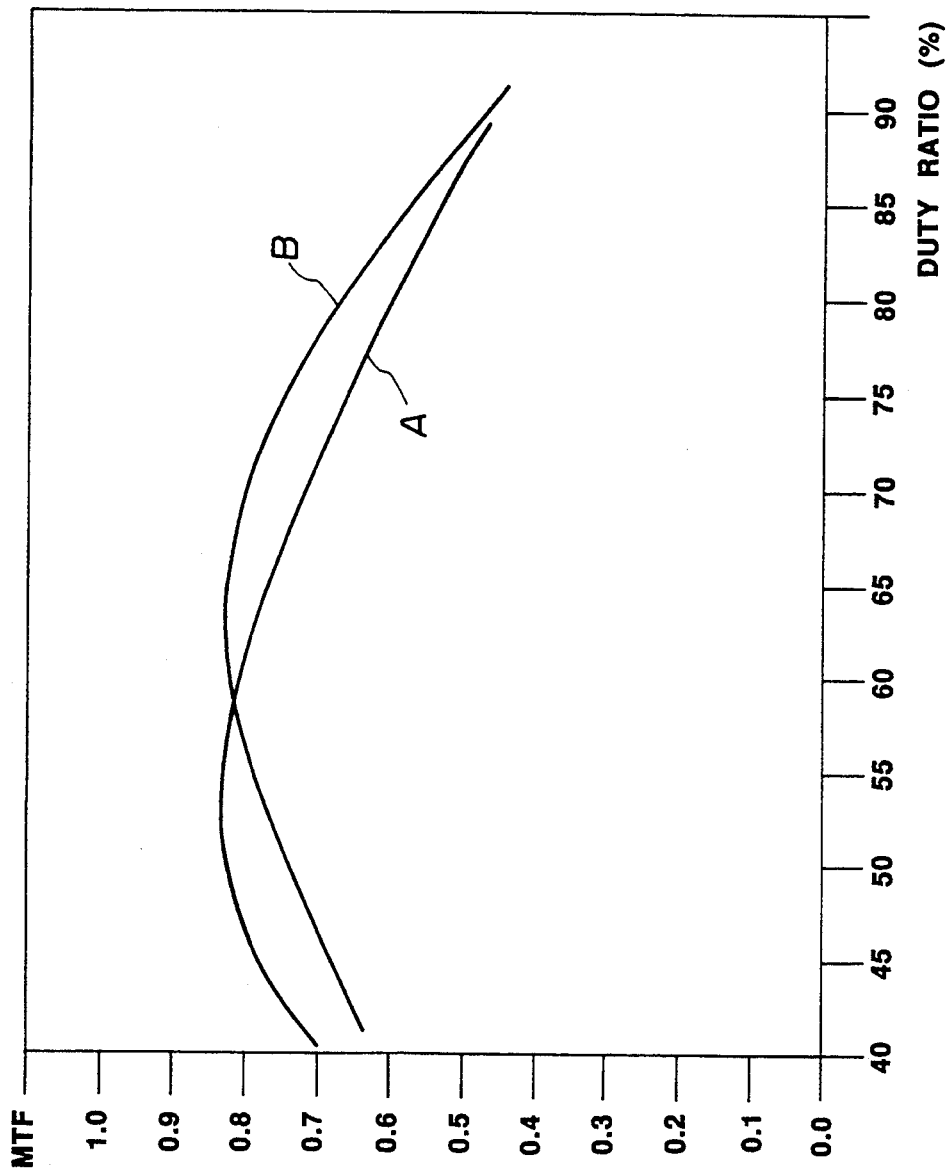
FIG. 13 is a drawing which shows characteristics of MTF of the first embodiment.

FIG. 13 is a drawing which shows the relation between the duty ratio of the AC wave included in the AC bias and the MTF.

In FIG. 13, a curve A shows the MTF characteristic of the initial state at the commencement of the use of the toner and a curve B shows the MTF characteristic of the intermediate state in which the toner has been used for 20,000 copies of the A4 size document, 30% of which is black image.

In the curve A, a peak value of the MTF appears when the duty ratio of the AC wave is 50%, so the duty ratio of 50% can be adopted as the optimum developing condition. In the curve B, a peak value of the MTF appears when the duty ratio of the AC wave is 65%, so the duty ratio of 65% can be adopted as the optimum developing condition.

As explained above, the test images are formed while changing the developing condition such as the duty ratio of the AC wave to be applied to the developing sleeve of the developing device, the MTFs of each of the test images are obtained, and the peak value of the MTF is detected. Therefore, the optimum developing condition can be determined.

According to this first embodiment, the high quality image can always be reproduced.

Second Embodiment

In the second embodiment, the application of the AC wave to the developing sleeve 34 can be suspended so that the DC bias alone is applied to the developing sleeve 34.

The test images are formed while changing the suspension period of the AC wave and the optimum developing condition is determined on the basis of the test images.

FIG. 14(A), 14(B) and 14(C) are drawings which show the examples of the AC bias applied to the developing sleeve 34. In these Figures, Tp denotes the application period of the AC wave and Tb denotes the suspension period of the AC wave. In this embodiment, the frequency of the AC wave is 4 kHz and the peak to peak voltage is 2 kVpp.

Figure 15:
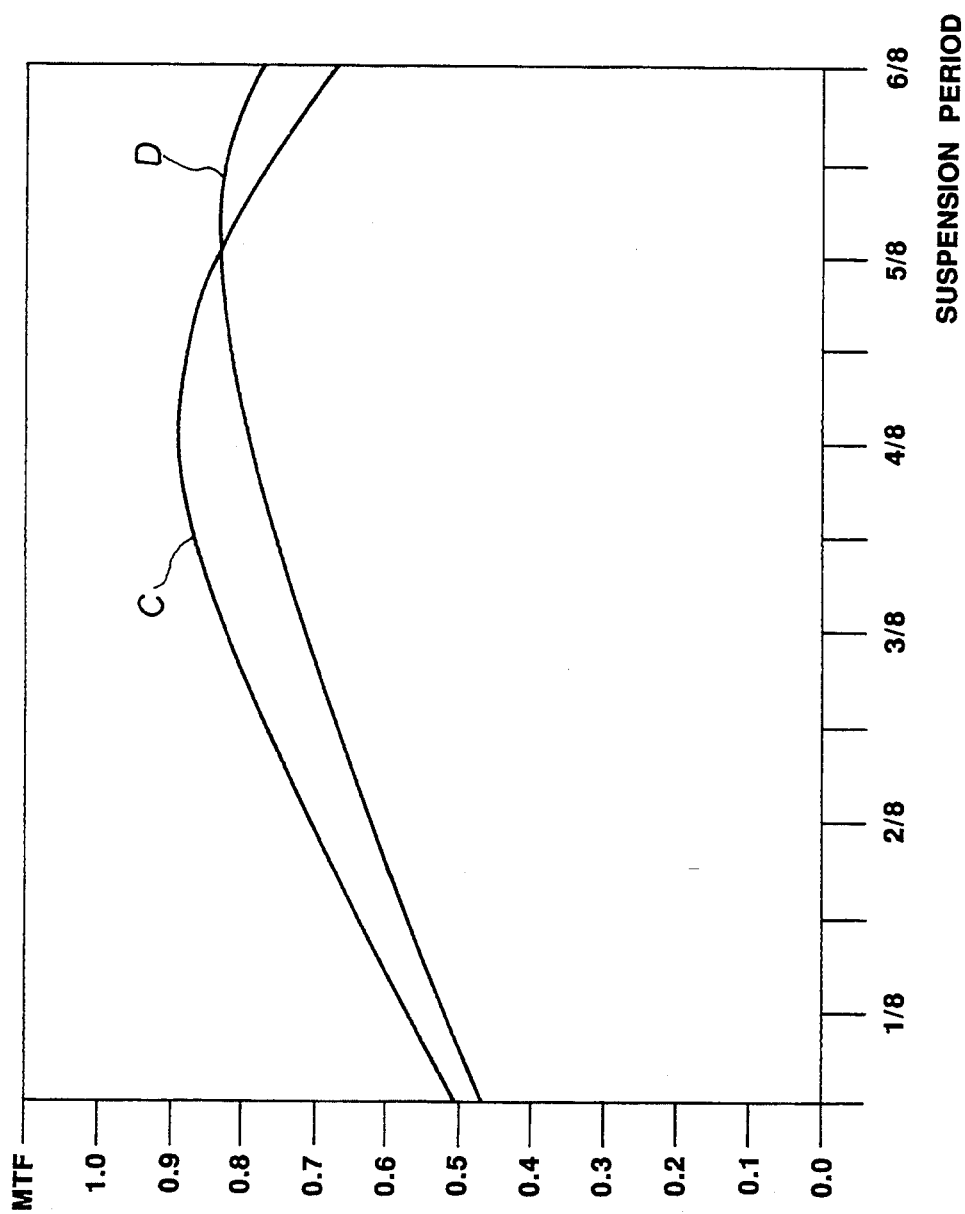
FIG. 15 is a drawing which shows characteristics of MTF of the second embodiment.

FIG. 15 is a drawing which shows the relation between the suspension period of the AC wave included in the AC bias and the MTF.

This drawing shows the characteristics of the MTF on changing the suspension period of the AC wave from 0 to $\frac{7}{8}$ of the application period of the AC wave (1 cycle) at intervals of $\frac{1}{8}$.

In FIG. 15, a curve C shows the MTF characteristic of the initial state at the commencement of the use of the toner and a curve D shows the MTF characteristic of the intermediate state in which the toner has been used for 20,000 copies of the A4 size document, 30% of which is black image.

In the initial state, a peak value of the MTF appears when the suspension period is 4/8 of the cycle, so 4/8 of the cycle can be adopted as the optimum developing condition. In the intemediate state, a peak value of the MTF appears when the suspension period is $\frac{5}{8}$ of the cycle, so $\frac{5}{8}$ of the cycle can be adopted as the optimum developing condition.

As explained above, the test images are formed while changing the developing condition such as the suspension period of the AC wave to be applied to the developing sleeve of the developing device, the MTFs of each of the test images are obtained, and the peak value of the MTF is detected. Therefore, the optimum developing condition can be determined.

Third Embodiment

Figure 16:
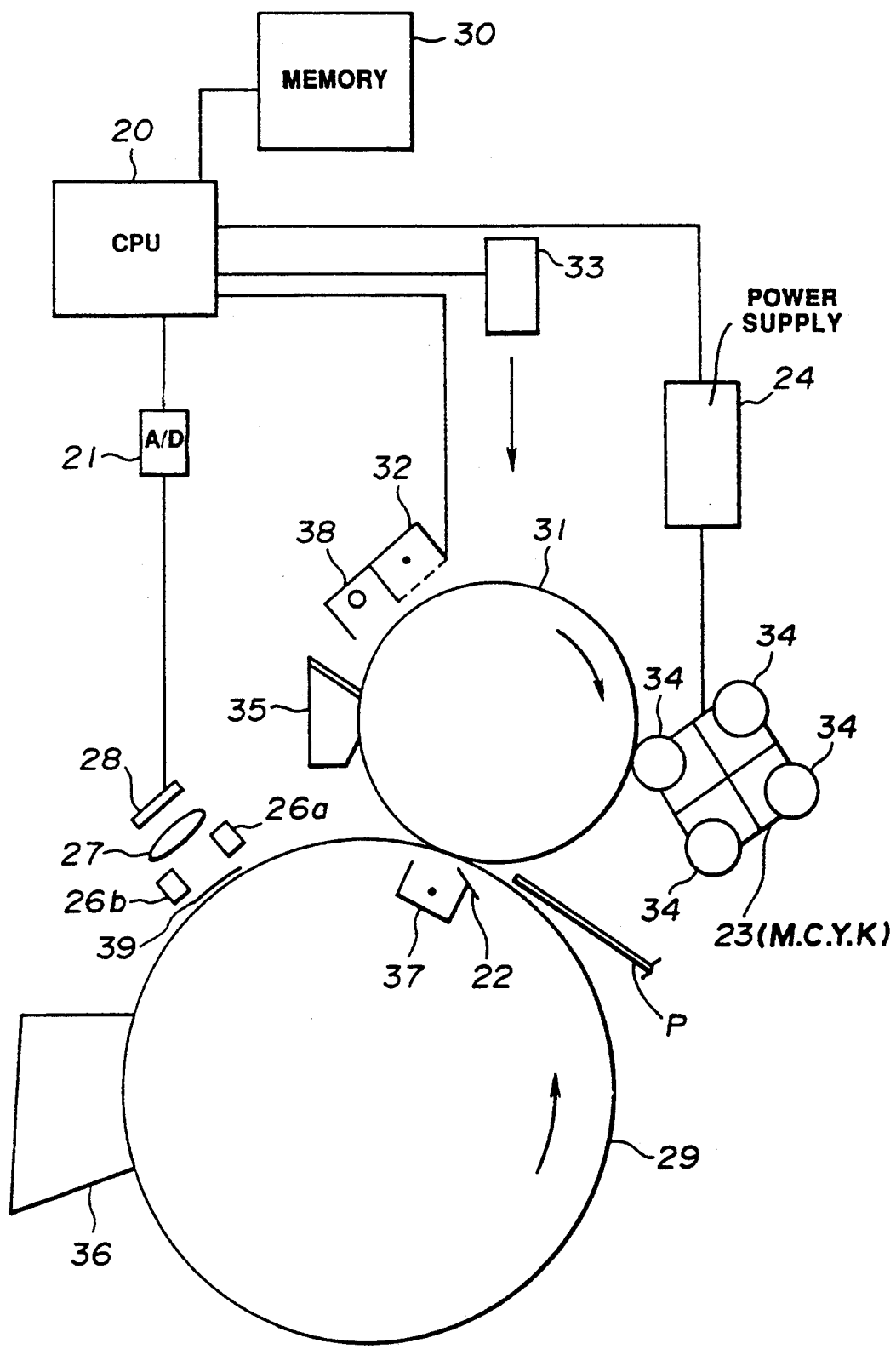
FIG. 16 is a drawing which shows another construction of the colour copying apparatus.

FIG. 16 shows another construction of the printer. In FIG. 16, the elements which have the same functions as FIG. 7 are denoted by the same reference numbers.

In this embodiment, the test image formed on the photosensitive drum 31 is transferred to the surface of the transfer drum 29 and the MTF is obtained by reading the test image 39 on the transfer drum 29. Therefore, the CCD sensor 28, the light sources 26a, 26b and the optical lens 27 are provided on the transfer drum 29.

The life of a photosensitive medium is generally shortened by the illumination of light. So it is not desirable that the photosensitive drum 31 is illuminated by unnecessary light. Accordingly, it is effective in the life of the photosensitive drum 31 that the test image 39 on the transfer drum 29 is read by the CCD sensor 28. A cleaning device 36 is provided for removing the toner on the transfer drum 29.

Fourth Embodiment

Figure 17:
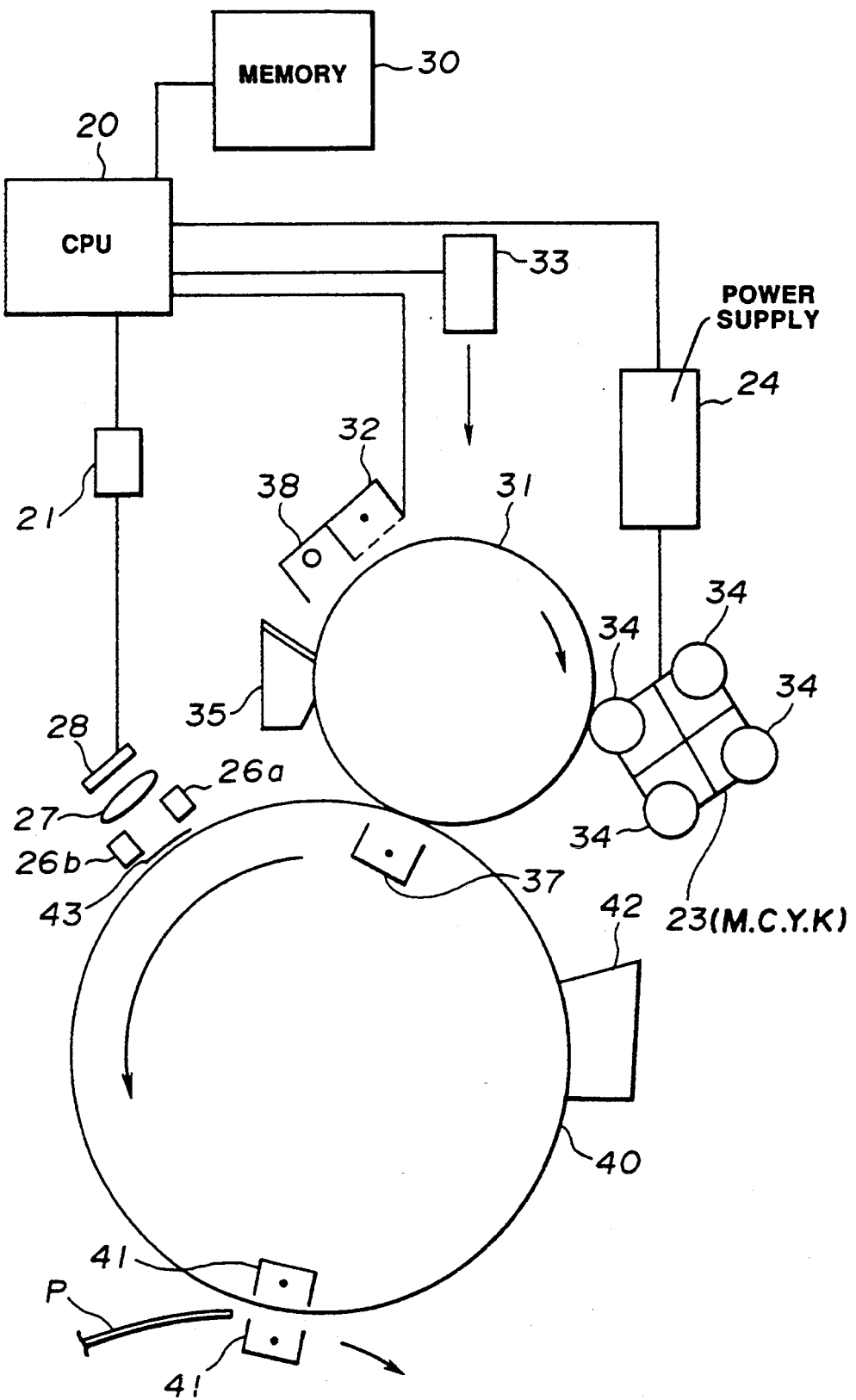
FIG. 17 is a drawing which shows a further construction of the colour copying apparatus.

FIG. 17 shows a further construction of the printer. In FIG. 17, the elements which have the same functions as FIG. 7 are denoted by the same reference numbers.

In this embodiment, the colour toner images (C,M,Y,K), which are sequentually formed on the photosensitive drum 31, are sequentially transferred to the interim transfer drum 40 and then the colour toner images (C,M,Y,K) are transferred to the recording medium P at once by the transfer charging device 41. A cleaning device 42 is provided for cleaning the interim transfer drum 40.

The test image formed on the photosensitive drum 31 is transferred to the interim transfer drum 40 and the MTF is obtained by reading the test image 43 on the interim transfer drum 40. Therefore, the CCD sensor 28, the light sources 26a, 26b and the optical lens 27 are provided on the interim transfer drum 40. According to this embodiment, the MTF is detected by reading the test image 43 formed on the interim transfer drum 40. Thus, the MTF can be detected by monitoring the image reproduction state which is close to the final image reproduction state. Accordingly, the final image can be reproduced with good quality.

Fifth Embodiment

In the above described embodiments, the colour printer is provided with a single photosensitive drum, whereas the colour printer in the following description has a plurality of photosensitive drums.

In FIG. 18, which shows a still further construction of the printer, a plurality of image forming stations, each corresponding to cyan, magenta, yellow and black, are provided in a series and rollers 56b, 56c and a transfer belt 56a are provided for transporting a recording medium P under the image forming stations. Further, the printer has photosensitive drums 31C,31M,31Y,31K each corresponding to cyan, magenta, yellow and black, discharge devices 32C,32M,32Y,32K, optical systems 33C, 33M,33Y,33K, developing devices 23C,23M,23Y,23K each accommodates cyan, magenta, yellow and black toners, cleaning devices 35C,35M,35Y,35K, transfer charging devices 37C,37M,37Y,37K, preconditioning exposure devices 38C,38M,38Y,38K, power supplied 24C,24M,24Y,24K, and plastics sheets 22C,22M,22Y,22K.

The above described constructions corresponding to each of the photosensitive drums 31C,31M,31Y,31K have the same functions as the photosensitive drum 31, the discharge device 32, the optical system 33, the developing device 23, the cleaning device 35, the transfer charging device 37, the preconditioning exposure device 38, the power supply 24 and the plastics sheet 22 shown in FIG. 7. However, they are provided corresponding to every colour. A cleaning device 68 is also provided for removing toner from the transfer belt 56a.

In this embodiment, the recording medium P is transported at a constant speed by the transfer belt 56a and passes through the image forming stations. Electrostatic latent images corresponding to each colour are formed on the each photosensitive drums 31C,31M,31Y,31K by means of laser beams from the optical systems 33C,33M,33Y,33K synchronised with the transport of the recording medium and the electrostatic latent images are developed by the developing devices 23C,23M,23Y,23K with cyan, magenta, yellow and black toners. The toner images on the photosensitive drums 31C,31M,31Y,31K are sequentially transferred to a recording medium P being transported.

In this construction, the test images formed on the photosensitive drums 31C,31M,31Y,31K are transferred to the transfer belt 56a and the test images 65 on the transfer belt 56a are illuminated by the light sources 26a, 26b and read by the CCD sensor 28 through the optical lens 27. The CPU 20 calculates the MTF on the basis of the output of the CCD sensor 28 stored in the memory 30, and then controls the developing conditions of the developing devices 23C,23M,23Y,23K.

According to this construction, the test images, each corresponding to every colour (C,M,Y,K) can be formed in parallel, so that the MTFs each corresponding to every colour test images can be obtained in parallel. The test images each corresponding to every colour, however, must be formed without overlapping each other.

As explained above, even if the printer adopts the construction such that a plurality of image following stations which have a plurality of photosensitive drums are provided for frame-sequentially forming different colour images, the high quality colour image can always be reproduced as well as in the above described other embodiments.

In the above embodiments, the optimum developing condition is determined on the basis of the detection of the MTF, however, other process conditions, such as the surface potential of the photosensitive drum, the intensity of the laser beam, the density of the toner, or the intensity of the exposure of the original document, may be controlled on the basis of the MTF detection.

Alternatively, the present invention may be applied not only to the electrophotographic process type printer, such as a laser beam printer, an LED printer or an LCD printer, but also to other types of printers, such as an ink jet printer or a thermal printer.

In the ink jet printer, an ejection of ink may be controlled on the basis of the MTF detection, and in the thermal printer, a temperature of a thermal head may be controlled on the basis of the MTF detection.

The present invention was explained above in reference to a few preferred embodiments, but needless to say, the present invention is not limited to these embodiments but various modifications and changes are possible.

We claim:

1. An image forming method comprising the steps of:
   a) forming a test image having a striped pattern on a recording medium by image forming means;
   b) reading the test image formed on said recording medium by a line sensor which is arranged opposite to said recording medium, said line sensor consisting of a plurality of photosensitive elements;
   c) detecting a maximum value and a minimum value of output from each photosensitive element of said line sensor and calculating the detected maximum value and minimum value; and
   d) determining an operating condition of said image forming means so as to obtain an optimum calculation result of said detecting means.

2. An image forming method according to claim 1, wherein the determining step repeats the forming step, reading step, and detecting step under a different operating condition of said image forming means.

3. An image forming method according to claim 1, wherein the operating condition of said image forming means is determined for every image forming color.

4. An image forming apparatus comprising:
   image forming means for forming an image on a recording medium;
   a line sensor, being arranged opposite to said recording medium, for reading the image formed on said recording medium, said line sensor including a plurality of reading elements; and
   control means for making said image forming means form a test image having a striped pattern on said recording medium, for making said line sensor read the formed test image, and for determining an optimum operating condition of said image forming means on the basis of a maximum value and a minimum value of output from said line sensor.

5. An image forming apparatus according to claim 4, wherein said control means makes said image forming means form the test image repeatedly under a different operating condition and determines the optimum operating condition on the basis of a calculation result of the maximum value and minimum value output from said line sensor after each test image is read.

6. An image forming apparatus according to claim 4, wherein said image forming means can form an image having a plurality of colors, and said control means determines the optimum operating condition for every color in the image.

7. An image forming apparatus according to claim 4, wherein said image forming means comprises latent image forming means for forming a latent image on the recording medium and developing means for developing the latent image, and wherein said control means controls a developing bias of said developing means.

8. An image forming apparatus according to claim 7, wherein said control means controls an alternating-current developing bias of said developing means.

9. An image forming apparatus comprising:
   image forming means for forming an image on a recording medium;

a line sensor, being arranged opposite to said recording medium, for reading the image formed on said recording medium, said line sensor including a plurality of reading elements; and control means for making said image forming means form a test image having a striped pattern on said recording medium, for making said line sensor read the formed test image, for calculating a modulation transfer function on the basis of output from said line sensor, and for determining an operating condition of said image forming means so that the calculated modulation transfer function is optimum.

10. An image forming apparatus according to claim 9, wherein said control means makes said image forming means form the test image repeatedly under a different operating condition and determines the optimum operating condition on the basis of the calculated modulation transfer function corresponding to each test image.

11. An image forming apparatus according to claim 9, wherein said image forming means form an image having a plurality of colors, and said control means determines the optimum operating condition for every color in the image.

* * * * *

UNITED STATES PATENT AND TRADEMARK OFFICE
CERTIFICATE OF CORRECTION

PATENT NO. : 5,376,956
DATED : December 27, 1994
INVENTOR(S) : YOSHINORI NAGAO, et al.

It is certified that error appears in the above-identified patent and that said Letters Patent is hereby corrected as shown below:

COLUMN 5

Line 20, "cleaning, device" should read --cleaning device--.

COLUMN 9

Line 8, "2kVDpp." should read --2kVpp.--.

COLUMN 12

Line 18, "calculating" should read --performing calculations on--.

COLUMN 13

Line 11, "output" should read --a maximum value and a minimum value of output--.

Signed and Sealed this

Ninth Day of May, 1995

BRUCE LEHMAN

Attest:

Attesting Officer

Commissioner of Patents and Trademarks